United States Patent [19]

Nakawaki

[11] Patent Number: 4,619,634
[45] Date of Patent: Oct. 28, 1986

[54] TORQUE TRANSMITTING BELT
[75] Inventor: Yasunori Nakawaki, Susono, Japan
[73] Assignee: Toyota Jidosha Kabushiki Kaisha, Japan
[21] Appl. No.: 707,821
[22] Filed: Mar. 4, 1985
[30] Foreign Application Priority Data Mar. 14, 1984 [JP] Japan .................................. 59-050026

[51] Int. Cl.$^4$ .............................................. F16G 1/24
[52] U.S. Cl. ..................................... 474/201; 474/242
[58] Field of Search ............... 474/201, 242, 244, 265, 474/272

[56] References Cited

U.S. PATENT DOCUMENTS 4,338,081  7/1982  Hattori et al. ...................... 474/201
4,465,469  8/1984  Cataldo ............................... 474/201
4,498,892  2/1985  Huntley ........................... 474/201 X
4,526,559  7/1985  Smirl ................................. 474/201
4,533,342  8/1985  Miranti, Jr. et al. ................ 474/201

FOREIGN PATENT DOCUMENTS 0081252  5/1983  Japan ................................. 474/201

Primary Examiner—Stephen J. Novosad
Assistant Examiner—Thuy M. Bui
Attorney, Agent, or Firm—Parkhurst & Oliff

[57] ABSTRACT

A torque transmitting belt spanned between an input and output pulleys including a circumferential groove of a V-shaped cross-section to transmit a torque between the pulleys. The torque transmitting belt is employed in a continuously variable transmission which adjusts the size of V-shaped groove(s) in one or both of the pulleys as a result of the variation of the pressure which forces the belt into groove(s). The torque transmitting belt has an endless carrier spanned between the pulleys and a plurality of torque transmitting blocks which are mounted by the endless carrier so that the blocks may be longitudinally shiftable along the endless carrier. The endless carrier includes a plurality of hoops which are superimposed each other. The endless carrier extends through a groove of the torque transmitting blocks, which has an opening adjacent the inner surface of the pulley. The hoops is designed to have different circumferential length according to its positions within the groove. The circumferential length of the hoop at the lift position of the side facing the opening of the groove is designed to be less than that at the right position within the groove.

12 Claims, 8 Drawing Figures

TORQUE TRANSMITTING BELT

BACKGROUND OF THE INVENTION

The present invention relates to a torque transmitting belt, and ore particularly to a torque transmitting endless belt spanned between input and output pulleys which include each circumferential groove of a V-shaped cross-section to transmit a torque between the pulleys.

There has been known a continuously variable transmission (CVT) comprising a torque transmitting belt extending between an input (driving) pulley and an output (driven) pulley, the ratio capable of being varied (ratio being defined as the RPM or speed ratio between the input and output pulleys), by adjusting the size of a V-shaped groove(s) in one or both of the pulleys as a result of the variation of the pressure which forces the belt into groove(s). Thus, the position of the belt on the pulleys and the effective diameter of the pulleys can be varied, which makes it possible to continuously vary the ratio between the input and output pulleys.

In the above-described CVT, such a torque transmitting belt has been employed as the belt comprises an endless carrier spanned between the pulleys and a plurality of torque transmitting blocks which are mounted by the endless carrier so that the blocks may be longitudinally shiftable along the endless carrier and which engage with the circumferential grooves of the pulleys at both end surfaces thereof and further engage with the endless carrier.

In this endless belt, the blocks are transmitted with a torque at the input (driving) pulley. The torque transmitting blocks gradually shift with the endless carrier toward the output (driven) pulley while the blocks contact with adjacent blocks each other. The blocks transmit the torque from the input pulley to the output pulley. Thus, the transmission of a torque is made from the input pulley and the output pulley.

In general, torque transmitting blocks are mounted on an endless carrier under the condition that the endless carrier extends through grooves provided on the torque transmitting blocks. There is known a torque transmitting block having a groove which opens at the position adjacent an inner surface of a pulley and which is closed by a member of the torque transmitting block. One of the above-described examples is disclosed in Japanese Laying-open Patent Publication No. Sho 57-23820. The torque transmitting block has a surface within the groove of the troque transmitting block, which an endless carrier contacts to transmit the torque between the endless carrier and the block.

An endless carrier comprises a plurality of belt-shaped hoops which are superimposed thereon. For example, an endless carrier comprises ten to fourteen hoops which are superimposed thereon. In general, a hoop is made of metal. Recently, a hoop made of plastics is also proposed.

Heretofore, the surface of a torque transmitting block which an endless carrier contact is formed to be upwardly rounded. When an endless carrier contacts the rounded surface of a torque transmitting block to transmit a torque therebetween, the endless carrier moves toward the highest position among the rounded surface of the block by the centering operation. This centering of the endless carrier prevents the endless carrier from moving in the lateral direction of the belt. Hence, in general, end surfaces of hoops which form the endless carrier are prevented from being struck on an inner surface of a pulley and a member of the block, which closes the groove at its inner end.

On the other hand, when the control pressure supplied into a hydraulic actuator of a pulley is low, the above-described centering operation is not sufficiently made. As shown in FIG. 8, hoops $11a$, $11b$, ..., $11n$ move in the lateral direction of the block.

When the control pressure supplied into a hydraulic actuator of a pulley is low, both magnitude of the vertical force exerted between a contact surface $13a$ of an endless carrier and a contact surface of an innermost hoop $11a$ and the magnitude of the vertical force exerted between the contact surfaces among the hoops $11a$, $11b$, ..., $11n$, are small. Hence, the hoops $11a$, $11b$, ..., $11n$ may move on a rounded contact surface $13a$ toward one end of the block in the lateral direction of the block. When the hoops $11a$, $11b$, ..., $11n$ move in the direction toward a neck portion $12b$ of a block 12 and strike on the neck portion $12b$, the discontinuous surface of the neck portion $12b$ contacts the end surfaces of the hoops $11a$, $11b$, ..., $11n$ and slides on them. This contact happens to generate cracks and scratches on the end surfaces of the hoops $11a$, $11b$, ..., $11n$. As a result, this causes a stress concentration, thereby shortening the life of the hoops.

On the other hand, when the hoops $11a$, $11b$, ..., $11n$ move in the direction toward the opening of the groove 13 to contact the surface 2 of the pulley and slide on the surface 2, the surface 2 of the pulley is a continuous surface, and the contact beween the hoops and the surface 2 of the pulley does not generate cracks nor scratches on the end surfaces of the hoops $11a$, $11b$, ..., $11n$. Hence, when the hoops $11a$, $11b$, ..., $11n$ moves in the direction toward the opening of the groove 13 to contact the surface 2 of the pulley, the end surfaces of the hoops $11a$, $11b$, ..., $11n$ are almost not damaged.

The movement of the hoops $11a$, $11b$, ..., $11n$ in the lateral direction of blocks may happen to be made at the time other than the time when the control pressure supplied into a hydraulic actuator is low. That is, the hoops $11a$, $11b$, ..., $11n$ slide each other by the difference of the circumferential speed between hoops. When the coefficient of friction generated among hoops $11a$, $11b$, ..., $11n$ decreases to lower the frictional force, the hoops $11a$, $11b$, ..., $11n$ may move in the lateral direction of the block.

SUMMARY OF THE INVENTION

The present invention was made in view of the foregoing background and to overcome the foregoing drawbacks. It is accordingly an object of this invnetion to provide a torque transmitting belt whose endurance is improved.

To attain the above objects, torque transmitting belt according to the present invention is employed in a continuously variable transmission for transmitting a torque between an input pulley and an output pulley. The torque transmitting belt has an endless carrier and a plurality of block members which are longitudinally shiftable along the hoops. The endless carrier consists of a plurality of hoops extending between and contacted around peripheral portions of the input and output pulleys. At least one of the hoops has the difference of the circumferential length in its lateral direction.

BRIEF DESCRIPTION OF THE DRAWINGS

The above objects, features and advantages of the present invention will become more apparent from the following description of the preferred embodiments taken in conjunction with the accompanying drawings, wherein.

DETAILED DESCRIPTION OF THE PREFERRED EMBODIMENTS

The present invention is described in detail with reference to the accompanying drawings which illustrate different embodiments of the present invention.

Figure 1:
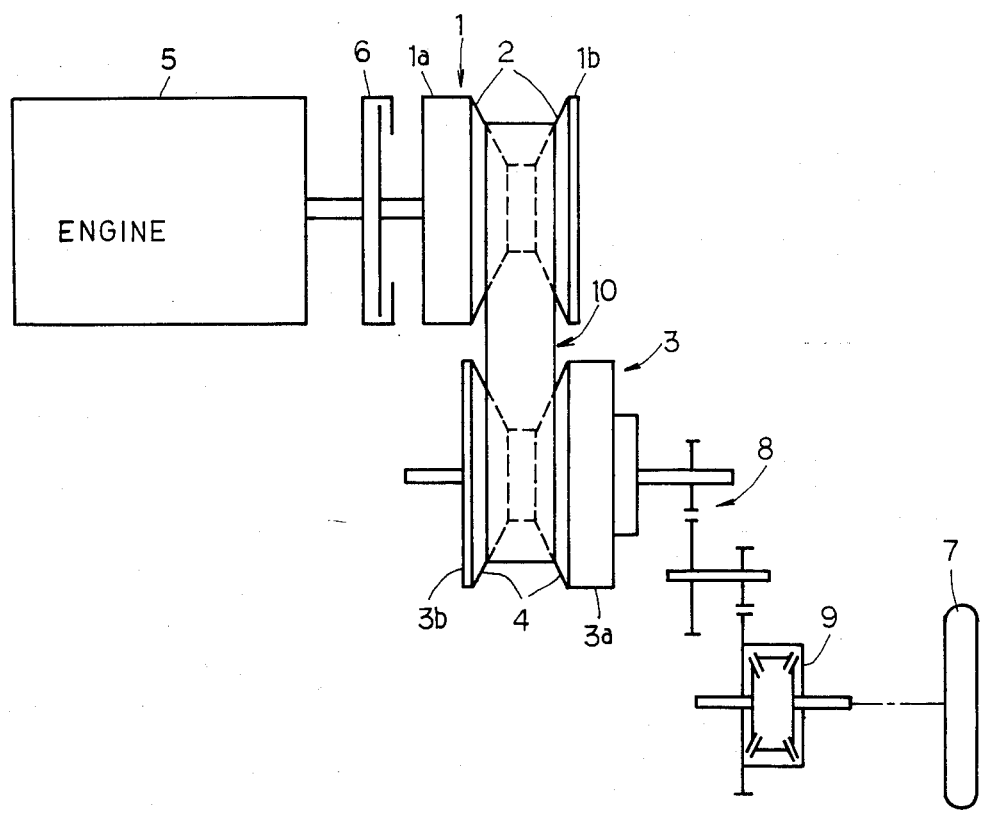
FIG. 1 is a schematic view of a driving mechanism equipped with a continuously variable transmission in which a torque transmitting belt according to the present invention is employed.

Referring now to the drawings, wherein same reference characters designate corresponding parts throughout several views, FIG. 1 shows a schematic view of a driving mechanism equipped with a continuously variable transmission in which a torque transmitting belt 10 according to the present invention is employed. An output shaft of a power source 5 such as an engine, is connected with a driving member of a clutch 6. A driven member of the clutch 6 is connected with an input shaft of a continuously variable transmission. The driving force of the power source 5 is transmitted through the clutch 6 to the continuously varible transmission. The transmission includes a V-shaped input pulley 1 coaxially provided to the clutch 6, and a V-shaped output pulley 3 provided in a parallel relationship with the input pulley 1. The input pulley 1 has a movable pulley 1a actuated by a hydraulic actuator, and a fixed pulley 1b. A V-shaped circumferential groove 2 is formed in a portion between the movable pulley 1a and the fixed pulley 1b. This circumferential groove 2 forms a driving surface through which the engine torque is transmitted to the belt 10.

The output pulley 3 comprises a fixed pulley 3b and a movable pulley 3a which is actuated by a hydraulic actuator. A V-shaped circumferential groove 4 is formed in a portion between the fixed pulley 3b and the movable pulley 3a. This circumferential groove 4 forms a follower surface through which the torque of the belt 10 is transmitted to the output pulley 3. The torque transmitting belt 10 fits in the V-shaped grooves 2 and 4 to transmit the torque of the input pulley 1 to the output pulley 3. An output shaft of the output pulley 3 is connected through a gear train 8 with a differential 9 whose output is further transmitted to tires 7. The widths of the pulleys 1 and 3 change due to the hydraulic actuator means, and thereby the torque from the engine 5 is transmitted while the speed ratio between the input pulley 1 and the output pulley 3 is continuously varied by the continuously variable transmission.

Next, the detail structure of the endless belt 10 is described hereunder in conjunction with the accompanying drawings, FIGS. 2 to 7.

Figure 2:
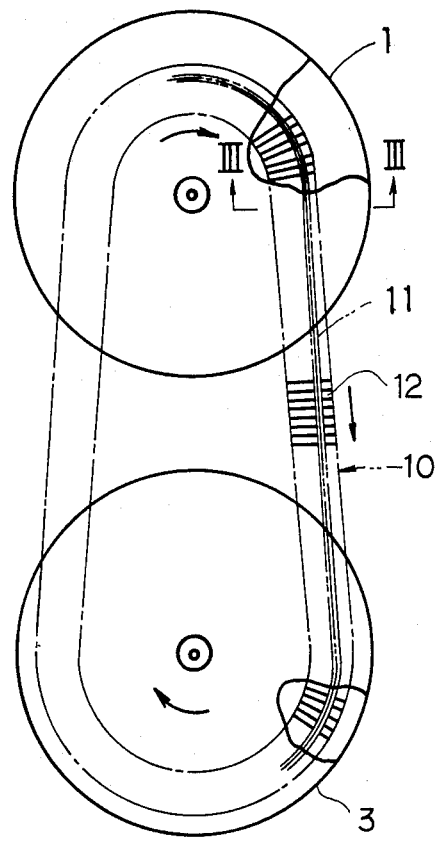
FIG. 2 is a side view of a continuously variable transmission which is shown in FIG. 1.

FIG. 2 illustrates a side view of a continuously variable transmission which is shown in FIG. 1. As shown in FIG. 2, the torque transmitting blocks 12 are mounted on the endless carrier 11 and chained together with the adjacent blocks.

Figure 3:
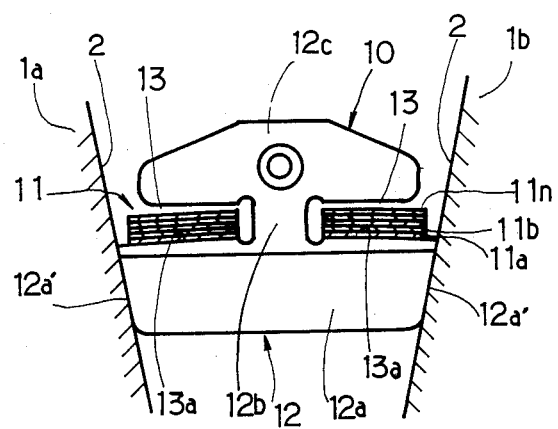
FIG. 3 is an enlarged cross-sectional view taken along the line III—III shown in FIG. 2.

FIG. 3 shows a cross-sectional view taken along the line III—III shown in FIG. 2, and illustrates the structure of the torque transmitting endless belt 10. The torque transmitting block 12 is made of metal. The block 12 comprises a main portion 12a, a head portion 12c, and a neck portion 12b which integrally connects the main portion 12a with the head portion 12c. The main portion 12a of the torque transmitting block 12 has both side surfaces 12'a which are inclined so that the surface 22 of the input pulley 1 may contact the inclined side surfaces 12a' of the main portion 12a. The neck portion 12b upwardly projects from the central part of the main portion 12a. The upper part of the neck portion 12b is integrally connected with the head portion 12c. There are provided grooves 13 defined among the head portion 12c, the neck portion 12b and the main portion 12a, at both sides of the neck portion 12b. A pair of the endless carriers 11 are located within the grooves 13, and thus the torque transmitting blocks 12 are mounted on the endless carrier 11. The upper surface 13a of the main portion 12a forms the endless carrier contact surface on which the endless carrier 11 contacts with a friction, thereby enabling the transmission of a torque between the carrier 11 and the blocks 12. The groove 13 is opened at its one lateral end which faces to the surface 22 of the pulley 1, and another lateral end of the groove 13 is closed by the neck portion 12b.

The endless carrier 11 comprises a plurality of hoops 11a, 11b, ..., 11n which are formed in a loop shape and superimposed each other. Ten to fourteen hoops are ordinally superimposed each other. For example, the sizes of one hoop are that the thickness is 0.2 mm and the width is 8 mm, and the circumferential length is 620 mm. Each hoop 11a, 11b, ..., 11n is made of metal material.

Figure 4:
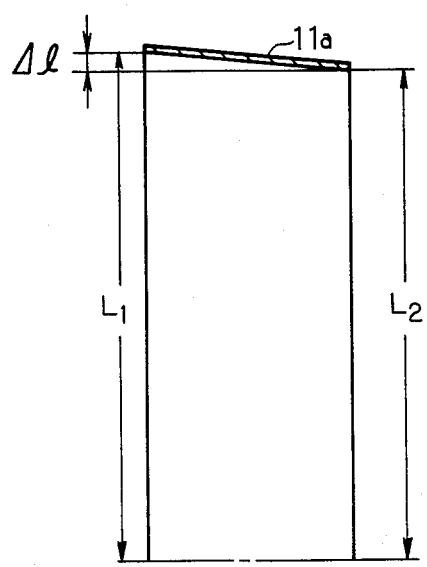
FIG. 4 is an enlarged cross-sectional view which shows a hoop employed in a torque transmitting belt according to an embodiment of the present invention.

FIG. 4 illustrates an enlarged cross-sectional view which shows an innermost hoop 11a employed a torque transmitting belt. As shown in FIG. 4, the innermost hoop 11a is designed to have a lateral left portion whose radius is longer by the amount $\Delta l$ than the lateral right portion. The circumferential length $L_1$ at the lataral left portion of the innermost hoop 11a is designed to be longer than the circumferential length $L_2$ at the lateral right portion.

Figure 5:
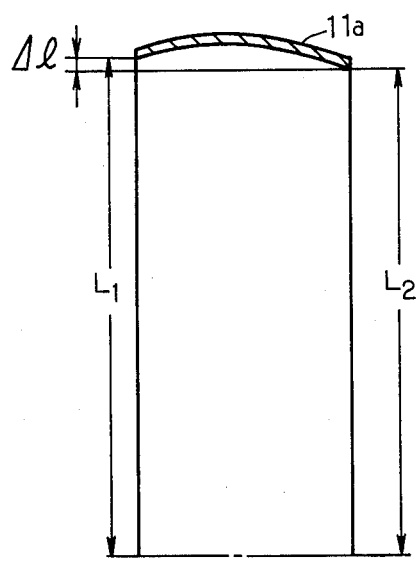
FIG. 5 is an enlarged cross-sectional view which shows a hoop employed in a torque transmitting belt according to another embodiment of the present invention.

FIG. 5 illustrates an enlarged cross-sectional view which shows an innermost hoop 11a employed in a torque transmitting belt according to another embodiment of the present invention. The hoop 11a employed in another embodiment of the present invention has a cross-sectional form which is rounded in the radially outward direction. The circumferential length $L_1$ at the lateral left portion of the innermost hoop 11a is designed to be longer than the circumferential length $L_2$ at the lateral right portion. Other hoops 11b, ..., 11n are designed to have different circumferential length according to the lateral right and left positions, as same as the innermost hoop 11a. The hoop 11a shown in FIGS. 4 and 5 is exaggeratingly enlarged in order to clarify the difference of the circumferential length between $L_1$ and $L_2$. The difference of the circumferential length of the practical hoop is an order of microns.

Figure 6:
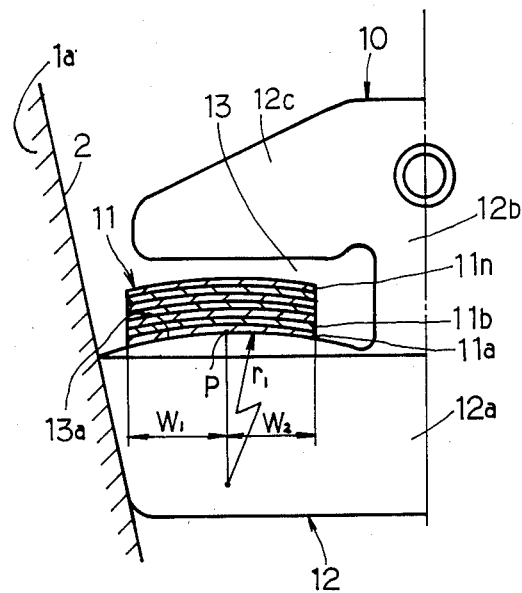
FIG. 6 is a partial view which shows the condition that an endless carrier is engaged with a torque transmitting block.

As shown in FIG. 6, the surface 13a on which the endless carrier 11 contacts a radius $r_1$ and is upwardly rounded in such a way as the rounded surface 13a is convex in the upward direction. The hoops 11a, 11b, ..., 11n of the endless carrier 11 are superimposed on the surface 13a. The hoops 11a, 11b, ..., 11n of the endless carrier 11 are designed to be located at the highest position on the surface 13a by the centering operation that the hoops are inclined to move toward the highest position on the surface 13a, under the condition that a prescribed frictional force is applied onto the hoops.

When the hoops 11a, 11b, ..., 11n shown in FIGS. 4 and 5 contact the upwardly rounded surface 13a as shown in FIG. 6, the portion of the length $L_1$ where the circumferential length of the hoop is longer, is located at the position adjacent the neck portion 12b of the block 12, and the portion of the length $L_2$ where the circumferential length of the hoop is shorter is located at the position facing the surface 22 of the pulley 1.

Figure 7:
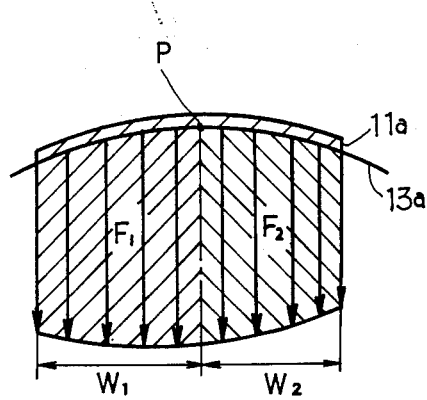
FIG. 7 is a view which shows the magnitude of the pressure force exerted between a hoop and a contact surface of an endless carrier.
Figure 8:
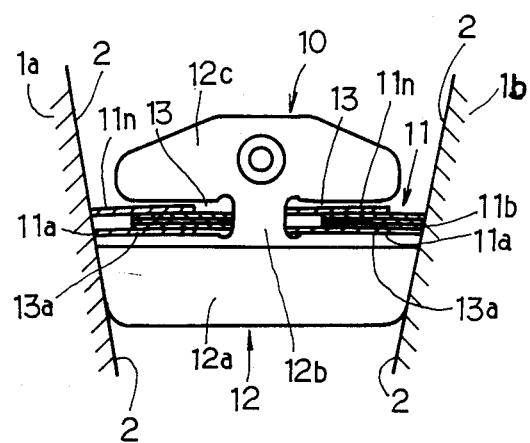
FIG. 8 is a view which shows the condition that hoops employed in a torque transmitting belt according to a prior art are displaced to contact a neck portion of a torque transmitting belt, and a V-shaped circumferential groove of a pulley.

In FIG. 6, the surface 13a of the main portion 12a is divided into two areas $W_1$ and $W_2$ at the both sides of the highest position of the rounded surface 13a. The frictional engagement exerted between the innermost hoop 11a and the surface 13a of the endless carrier 11, is now considered. The pressure force exerted on the surface 13a of the endless carrier 11 in the divided areas $W_1$ and $W_2$, is illustrated in FIG. 7.

The magnitude of the pressure force $F'_1$ at the position facing an opening 13a of the groove 13 is greater than that of the pressure force $F'_2$ at the position closest to the neck portion 12b of the block 12. This difference of the magnitude of the force is generated by the difference of the circumferential length between the left and right positions of the hoop 11a. That is, the circumferential length of the hoop 11a at the position facing the opening 13a of the groove 13 is designed to be less than that at the position closest to the neck portion 12b of the block 12. Thus, the magnitude of the pressure force $F_1$ in the area $W_1$ is different from the magnitude of the force $F_2$ in the area $W_2$, and the force within the area $W_1$ is designed to be greater than that within the area $W_2$. Hence, under the condition that the control pressure supplied into a hydraulic actuator for controlling the width of a pulley is low and the frictional force generated between the hoop 11a and the surface 13a of the endless carrier 11 is not sufficient to maintain the centering operation and the hoop 11a is enabled to move in its lateral direction, the hoop 11a moves toward the area $W_1$ by the difference of the frictional and pressure force generated between the forces $F_1$ and $F_2$. The hoop 11a moves toward the surface 22 of the pulley 1 within the groove 13. This movement prevents the hoop 11a from striking against the neck portion 12b of the block 12.

The above-described operation is also applied into other hoops 11b, ..., 11n. Other hoops 11b, ..., 11n are also prevented from moving toward the neck portion 12b of the block 12. It is also experimentally confirmed that when the difference of the circumferential lengths of the hoops 11a, 11b, ..., 11n between the right and left positions, the hoops 11a, 11b, ..., 11n moves not toward the area $W_2$ but toward the area $W_1$ where the circumferential length of the hoop is short. Thus, when the hoops 11a, 11b, ..., 11n move in the lateral direction, the hoops move toward the area $W_1$. Hence, the end surfaces of the hoops 11a, 11b, ..., 11n do not contact the neck portion 12b of the block 12. This improves the endurance of the hoops.

According to the above-described embodiments, all the hoops 11a, 11b, ..., 11n, which construct the endless carrier 11, are designed to have different circumferential length between the right and left positions, but it may be made that at least one of the hoops is designed to have different circumferential length between the right and left positions.

Further, according to the above-described embodiments, the surface 13a of the endless carrier 11 is upwardly rounded, but the surface 13a may be flat.

The hoops 11a, 11b, ..., 11n may be made of plastics.

While the present invention has been described in its preferred embodiments, it is to be understood that the invention is not limited thereto, and may be otherwise embodied within the scope of the following claims.

What is claimed is:

1. A torque transmitting belt employed in a continuously variable transmission means for transmitting a torque between an input pulley and an output pulley, comprising:
   an endless carrier including a plurality of hoops extending between and contacted around peripheral portions of said input and output pulleys;
   a plurality of block members being longitudinally shiftable along the hoops, each of said plurality of block members including a head portion, a main portion and a neck portion, said neck portion connecting the main portion with the head portion, wherein the neck, head and main portions cooperate to form a groove, the endless carrier extending through said groove; and
   at least one of said plurality of hoops having an inner side with an inner circumferential length and an outer side with an outer circumferential length, said inner side facing said neck portion of the block member, said inner circumferential length being greater than said outer circumferential length.

2. The torque transmitting belt of claim 1, wherein said main portion has a top surface and a plurality of side surfaces, said side surfaces contacting the pulleys to transmit a torque between said pulleys, and wherein said neck portion is connected to said main portion at a central location in a lateral direction thereof and said neck portion is connected to said head portion at a central location in a lateral direction thereof.

3. The torque transmitting belt of claim 1, wherein a first hoop of the endless carrier contacts a top surface of the main portion of the block member.

4. The torque transmitting belt of claim 3, wherein the top surface of the main portion of the block member is rounded.

5. The torque transmitting belt of claim 3, wherein the top surface of the main portion of the block member is flat.

6. The torque transmitting belt of claim 1, wherein said outer side of said hoop is adjacent the input pulley and the output pulley.

7. The torque transmitting belt of claim 6, wherein the hoop extends in a straight line, between its outer side and its inner side.

8. The torque transmitting belt of claim 6, wherein the hoop extends in a curved line, between its outer side and its inner side.

9. The torque transmitting belt of claim 1, wherein each of said plurality of hoops have an outer side having an outer circumferential length and an inner side having an inner circumferential length, said outer circumferential length being greater than said inner circumferential length.

10. The torque transmitting belt of claim 9, wherein the endless carrier comprises ten to fourteen hoops.

11. The torque transmitting belt of claim 1, wherein the block member comprises metal.

12. The torque transmitting belt of claim 1, wherein the block member is made of plastics.

* * * * *